Aug. 28, 1934.   E. WALDER   1,971,971
ELECTRICAL HEATING APPLIANCE
Filed Jan. 30, 1932   2 Sheets-Sheet 1

INVENTOR.
Emil Walder
BY
Herbert S. Fairbanks
ATTORNEY.

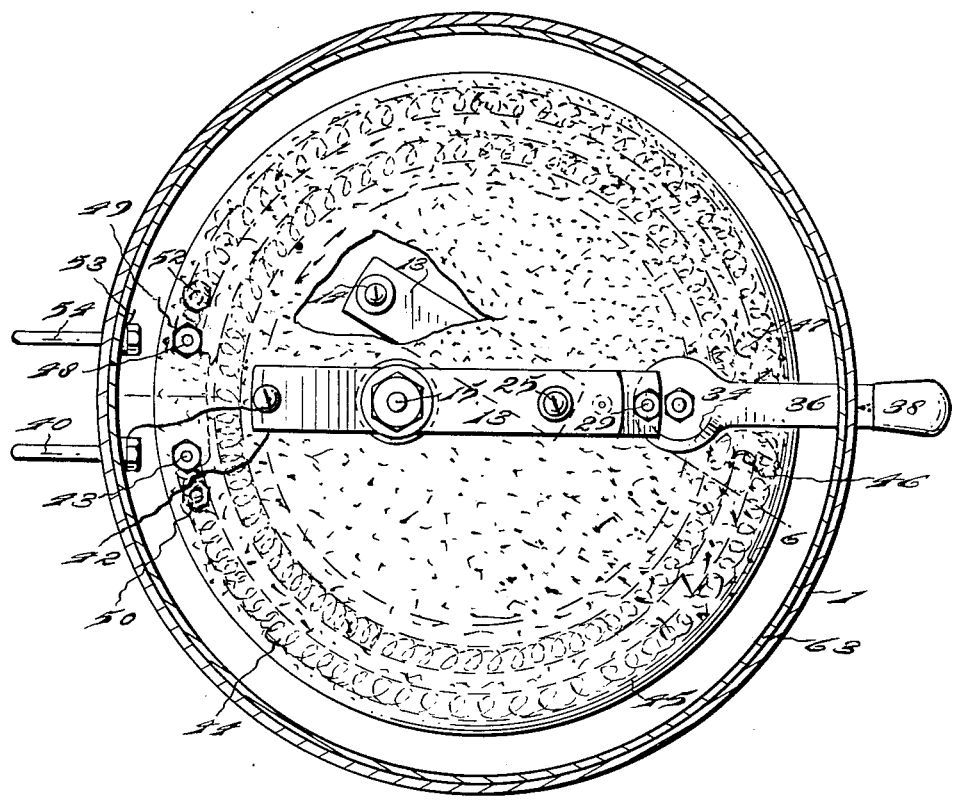

Patented Aug. 28, 1934

1,971,971

UNITED STATES PATENT OFFICE 1,971,971

ELECTRICAL HEATING APPLIANCE

Emil Walder, Philadelphia, Pa., assignor to National Stamping & Electric Works, Chicago, Ill., a corporation of Illinois Application January 30, 1932, Serial No. 589,814

6 Claims. (Cl. 219—19)

In my co-pending application Serial No. 581,-116, I have described and broadly claimed a novel automatic control for electrical heating appliances which, although capable of general application, was illustrated in conjunction with an electric heating iron.

In my present invention the thermostatic switch is similar to that disclosed in my prior pending application aforesaid except for its control, and I have shown it as embodied in a waffle iron.

With the foregoing in view, the object of my present invention is to devise a novel thermostatic heat control for electrical appliances and also to devise a novel manually actuated means for setting such thermostatic heat control so that the circuit will be opened and closed at predetermined temperatures.

A further object of the invention is to devise a novel waffle iron wherein a trade-mark indicative of the manufacturer will be illuminated by light rays from the electric heating unit, provision also being made for directing the rays towards such trade symbol.

A further object of the invention is to devise novel means for mounting the thermostatic switch and its control so that the operator can predetermine the temperature at which the circuit will be opened and closed through the upper and lower heating grids of the waffle iron.

With the above and other objects in view, as will hereinafter more clearly appear, my invention comprehends a novel thermostatic heat control for electrical appliances which can be employed in conjunction with any desired type of heating appliance but which, for purpose of illustration, I have shown as embodied in a waffle iron.

It further comprehends a novel construction and arrangement of a thermostatically controlled switch and novel means for manually adjusting the switch so that it will be opened and closed at predetermined temperatures of the heating appliance to which the thermostat is operatively connected.

It further comprehends novel means for utilizing the heating unit of the appliance to illuminate a trade symbol carried by and forming a part of the electric heating appliance.

Other novel features of construction and advantage will hereinafter appear in the detailed description and the appended claims.

For the purpose of illustrating the invention, I have shown in the accompanying drawings a typical embodiment of it, which, in practice, will give satisfactory and reliable results. It is, however, to be understood that this embodiment is typical only and that the various instrumentalities of which my invention consists can be variously arranged and organized, and the invention is not limited to the precise arrangement and organization of these instrumentalities as herein set forth.

Figure 5 is a section on line 5—5 of Figure 1.

Figure 6 is a sectional view on line 6—6 of Figure 5, of the thermostatic switch and a grid similar to that shown in Figure 1 but showing certain of the parts in different relations from that shown in Figure 1.

Figure 7 is a sectional view through the relatively stationary contact carrying member, showing more clearly the manner in which it is insulated from the means employed to adjust its setting.

Similar numerals of reference indicate corresponding parts.

Referring to the drawings:—

Figure 1:
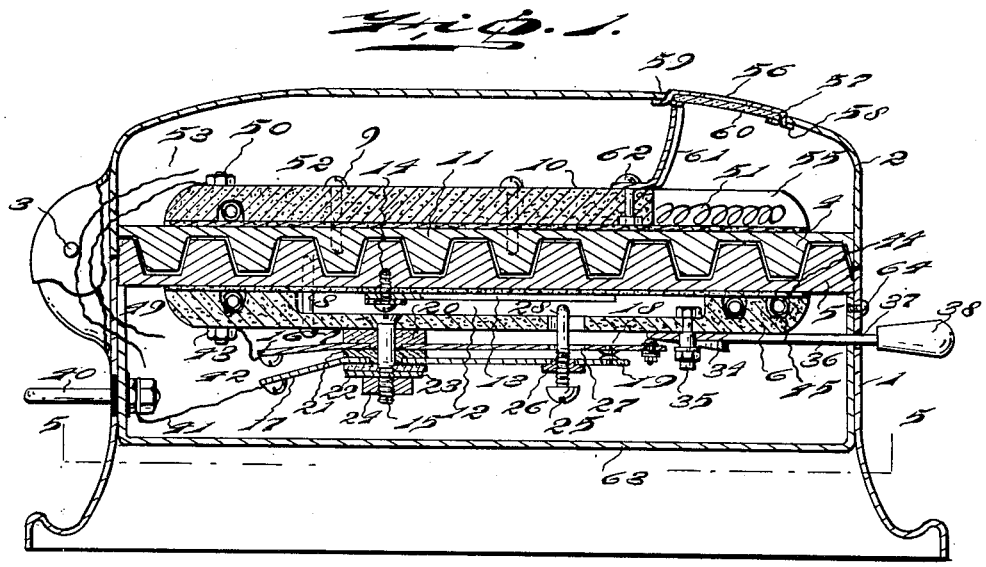
Figure 1 is a sectional elevation of an electric heating appliance in conjunction with which a thermostatic heat control embodying my invention is employed.
Figures 2, 3:
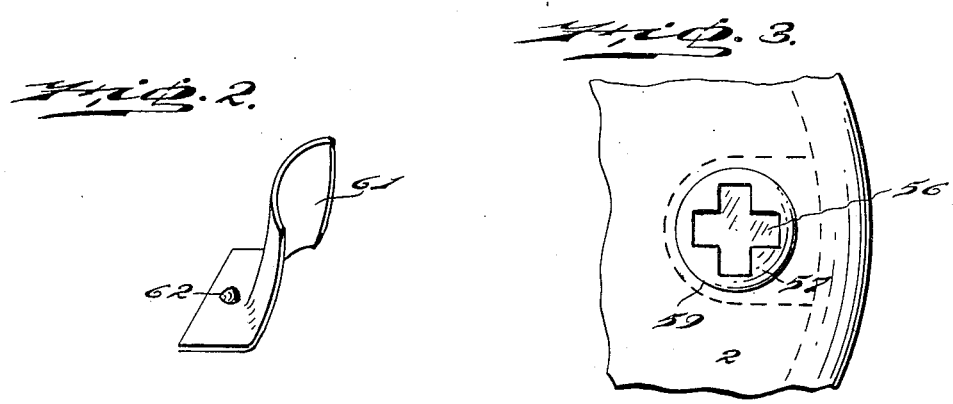
Figure 2 is a perspective view showing in detached position a reflector employed for directing rays of light from the heating unit towards a trade symbol.
Figure 3 is a top plan view of a portion of the outer casing, showing more clearly the trade symbol which is to be illuminated.
Figure 4:
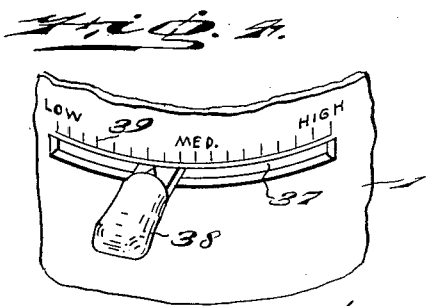
Figure 4 is a front elevation showing more clearly the manner in which the temperature is indicated at which the thermostatic switch will open and close.

The waffle iron in the conventional manner is provided with a sectional casing having the bottom section 1 and the top section 2 which are hinged together as at 3. The upper section is provided in any desired or conventional manner with a grid 4 and in a similar manner the lower section is provided with a grid 5, these grids having complementary recesses and lugs of any desired formation for forming a waffle iron.

The lower grid 5 has secured to it the disc 6 by means of fastening devices 7 which also pass through a sheet of asbestos 8. In a similar manner the top cooking grid 4 has secured to it by fastening devices 9 a disc 10 of insulating material, the fastening devices also passing through an asbestos sheet 11 of the same area as that of the disc 10. The lower disc 6 is centrally recessed as at 12 to provide for the movement of the thermostatic element 13 which is preferably of bi-metallic strips. This element is fixed at one end with respect to the grid 5 by means of a fastening device 14.

The switch mechanism is best seen in Figures 1 and 6 and will now be explained. The disc 6 has depending from it a post 15 illustrated as in the form of a screw which serves as a mounting for a flexible metal strip 16 and a flexible metal strip 17, each of which forms a contact carrying member. The strip 16 has secured to it near its free end the relatively fixed contact 18 and the strip 17 has secured to it near its free end, the relatively movable contact 19 which cooperates with the relatively fixed contact 18. These two contact carrying members 16 and 17 are secured in spaced relation on the post 15 and are insulated from each other. The post 15 passes through the lava washer 20 interposed between the disc 6 and the contact carrying member 16. A lava washer 21 is interposed between the contact carrying members 16 and 17. Beneath the contact carrying member 17 is a mica washer 22, then comes a brass washer 23 and the parts are secured in assembled position by means of the nut 24 in threaded engagement with the post 15. The contact carrying members are apertured to permit the post 15 to pass therethrough and these apertures are of greater diameter than that of the post so that the contact carrying members are retained in spaced insulated relationship.

The movable contact carrying member 17 carries an adjusting screw 25 in threaded engagement with it and provided with a lock nut 26. This screw 25 passes through an aperture 27 in the contact carrying member 16 and also through an aperture 28 in the disc 6 and has its free end in the path of the thermostatic element 13 so that when the temperature of the grid 5 increases the thermostatic element 13 will deflect downwardly until it contacts with the screw 25, and on its further deflection it will move the free end of the contact carrying member 17 downwardly to separate the contact 19 and 18 and thereby open the electric circuit.

The free end of the contact carrying member 16, see more particularly Figure 7, is apertured to receive the shank of a rounded button 29. This shank passes through an insulating washer 30 and through the insulating washer 31, and a metal washer 32 is provided with a nut 33. It will now be clear that the button 29 is insulated from the contact carrying member 16.

34 designates a cam which contacts with the button 29 and is pivotally mounted at 35 on the disc 6 of the heating unit. This cam is provided with an arm 36 which passes through a slot 37 in the lower casing section 1 and is provided with a grasping handle 38. One side of this slot is provided with the graduations 39 and the words "low" "med" and "high" are indicated in spaced relationship to indicate the different degrees of temperature of the heating appliance.

The prong 40 of the heating appliance is electrically connected by means of a conductor 41 with the contact carrying member 17. The contact carrying member 16 has a conductor 42 leading to the binding post 43 to which is connected the resistance wire 44 located in the grooves 45 in the disc 6, it being seen that this resistance wire is looped around the shoulder 46 and around the shoulder 47 and connected to the binding post 48. A conductor 49 leads from the binding post 48 through the hinge connection to the binding post 50 for the resistance wire 51 of the upper heating element and returns to the binding post 52, the binding post 52 being electrically connected by means of a conductor 53 with the prong 54 of the electric appliance.

The upper heating element has its disc 10 slotted as indicated at 55 in order that the light rays from it will pass to the trade symbol 56 formed by cutting out the disc 57 which is provided with clips 58 which pass through an opening 59 in the cover section of the appliance and are bent beneath such cover and also beneath the marginal portion of a frosted glass or lens 60. A curved reflector 61 is provided with a base flange through which passes a fastening device 62 which connects it with the disc 10 of the upper heating unit.

In order to prevent the heat from the heating unit injuring the table or other support on which the waffle iron is placed, I provide a pan 63 seated within the lower casing section 1 and enclosing the bottom thereof, and the sides of the pan are secured in assembled position by means of fastening devices 64 and the prongs 40 and 54 of the heating appliance.

The operation of my novel thermostatic heat control for electrical appliances will now be apparent to those skilled in this art and is as follows.

The prongs 40 and 54 are connected in the usual manner with a source of electric supply. The position or setting of the relatively stationary contact 18 is produced by rocking the cam 34 by means of the handle 38 into a position which corresponds with the degree of temperature at which the circuit is to open and close. When the button 29 is on the low point of the cam the movement of the heat responsive element formed by the thermostatic element 13 will not be sufficient to move the screw 25 to effect the separation of the contacts 18 and 19 and thus open the circuit.

It will be apparent that in the position seen in Figure 6 the free ends of the contact carrying members have both been moved downwardly, the contact carrying member 16 by the cam 34 and the contact carrying member 17 due to the element 13 moving the screw 25 downwardly so that the contacts 18 and 19 are separated and the circuit is opened.

It will thus be apparent that the circuit will be automatically opened and closed at the degree of temperature for which it is manually set.

A visible signal is indicated as to whether or not the circuit is opened or closed. This signal is so constructed that it will illuminate a trade symbol, such as, for example, the trade-mark of the manufacturer of the thermostatic heat control herein illustrated.

It will now be apparent that I have devised a new and useful thermostatic heat control for electrical appliances which embodies the features of advantage enumerated as desirable in the statement of the invention and the above description, and while I have in the present instance, shown and described a preferred embodiment thereof which will give in practice satisfactory and reliable results, it is to be understood that this embodiment is susceptible of modification in various particulars without departing from the spirit or scope of the invention or sacrificing any of its advantages.

Having thus described my invention what I claim as new and desire to secure by Letters Patent, is:—

1. In an electrical appliance, a casing having an upper and a lower section, the upper section having in its top wall an opening, a trade symbol covering said opening, a heating unit within said casing and a disc of insulating material in which said unit is embedded and having a portion removed to expose a plurality of strands of the resistance wire to illuminate said trade symbol.

2. In an electrical appliance, a casing, an upper heating grid within said casing having an exposed resistance wire, insulating material embedding the resistance wire except spaced strands of the exposed portion, said casing having an opening above said exposed resistance wire, a symbol closing said opening and illuminated by light rays from said exposed resistance wire, and a reflector carried by the upper grid in proximity to said opening to deflect the rays of light towards such opening.

3. In a waffle iron, a sectional casing having the sections movably connected, a heating grid in said casing, a disc of insulating material in which said heating unit is embedded and having a portion removed to expose juxtaposed strands of the resistance wire of said heating grid, said casing having an opening in its upper section in proximity to said exposed resistance wire, a glass covering said opening, a reflector fastened to the upper grid in proximity to said exposed resistance wire to direct rays of light towards said glass, and a thermostatic heat control within said casing for said heating grid.

4. A waffle iron having an upper and a lower casing section hinged together, a grid for each section, a sheet of asbestos for each grid and covering the outer face thereof, an insulating member for each grid contacting with said sheet, a resistance wire embedded in said insulating members, the upper insulating member having an opening to expose its resistance wire, said upper casing having an opening, and a curved reflector secured to the upper grid in proximity to said opening to reflect rays from juxtaposed strands of the resistance wire to said opening to visibly indicate if the circuit is closed through the resistance wire.

5. A waffle iron having an upper and a lower section hinged together, a grid for each section, a heating unit for each section, a sheet of asbestos between the grid and heating unit of each section, a pan closing the bottom of the lower casing section having its bottom spaced from the bottom of the lower casing section and from the lower grid, and its side wall extending in close proximity to the side wall of the lower casing section, and prongs connected with said heating units and contributing to fixedly secure said pan to said lower casing section.

6. A waffle iron having a lower casing section, a heating grid for said section, a pan having its bottom disposed between the bottom of said section and said grids and its side wall extending in close proximity to the wall of said casing section, and prongs for the reception of the socket of an electric supply conductor extending through said side walls and contributing to fixedly secure said pan to said casing.

EMIL WALDER.